April 26, 1960 H. M. LIFTON 2,933,811
DENTAL BITE TRAY
Filed May 21, 1958 2 Sheets-Sheet 1

INVENTOR.
HERMAN M. LIFTON
BY Cullen & Cantor
ATTORNEYS

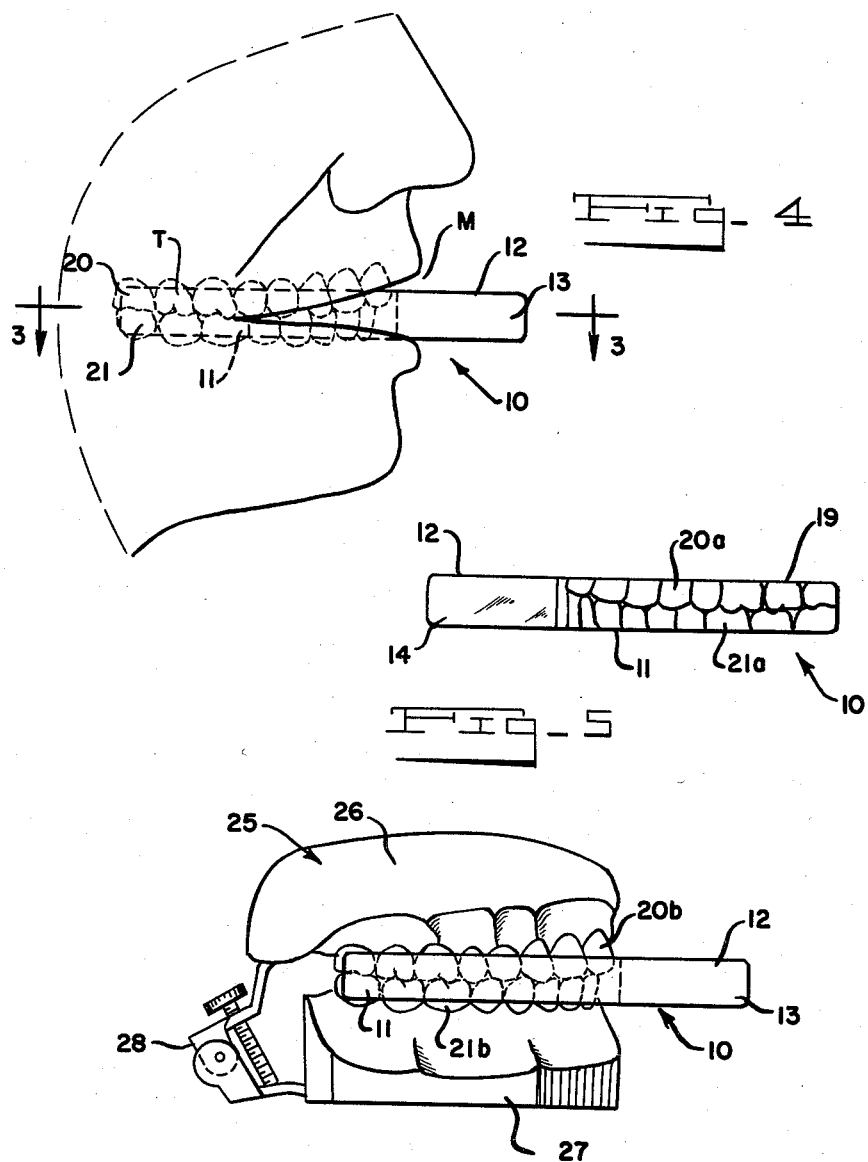

United States Patent Office 2,933,811
Patented Apr. 26, 1960

2,933,811

DENTAL BITE TRAY

Herman M. Lifton, Melvindale, Mich.

Application May 21, 1958, Serial No. 736,826

1 Claim. (Cl. 32—19)

This invention relates to a dental bite tray, and more particularly to a device and to a method for registering and transferring the centric relationship between the upper and lower jaws of a human to a dental articulator.

In various types of dental work, it is necessary to prepare a three-dimensional reproduction of the teeth of a patient. Frequently, this reproduction or model is made of plaster in the form of a mechanical or artificial set of jaws, referred to as an articulator, which accurately reproduces the teeth of a patient so that the dentist can use it to prepare inlays, bridges, etc., at his convenience and in his own laboratory, and then, after the work is completed, fit the work into the mouth of the patient.

However, one problem which frequently arises is that it has been extremely difficult to accurately reproduce the human centric relationship upon an articulator. In the past, because the centric relationship on the articulator was not exactly the same as that of the jaws of the patient, the finished inlay or bridge or the like, when seated in place in the patient's teeth, frequently interferred with his occlusion, thus being extremely uncomfortable as well as not functioning properly. Frequently, the dentist was required to do considerable additional work after inserting the inlay or bridge or the like in the patient's mouth in order to render the occlusion accurate, functionally proper and comfortable.

Thus, it is an object of the present invention to provide a device and a method for registering the centric relationship between the upper and lower jaws of a patient and accurately transferring this relationship to a dental articulator.

The method basically consists of making an impression of the buccal or outside surface area of the crowns of the upper and lower teeth. Then by inserting the cast model reproductions of these teeth into this impression and thereafter securing these cast models to an articulator, the articulator accurately reproduces the natural human jaw centric relationship.

Previously, the transfer of the centric relationship to an articulator involved inserting various materials between the teeth of a patient and inserting the cast models of the teeth in the registrations thus obtained for carrying to the articulator. This method is highly inaccurate and produces a gross distortion of the centric relationship on the articulator. The resulting piece of dental prosthesis constructed from this articulator is generally inaccurate in its occlusal function.

A further object of this invention is to provide a device comprising a strip of material, mounted upon a suitable rigid backing, which functions to register the impression of the buccal sides of the crowns of the teeth in the bite area, between the gingival lines. This impression serves to transfer the cast models of the teeth to an articulator in their correct centric relationship.

These and other objects and advantages of this invention will become apparent upon reading the following description of which the attached drawings form a part.

Referring to the attached drawings, in which:

Fig. 4 is a fragmentary, phantom lined view, showing an elevation of the bite tray in use in the mouth of a patient;

Fig. 5 is a view taken in the direction of arrow 5 on Fig. 3 of the bite tray, per se, to show the impression formed in the liner material;

Fig. 6 shows the bite tray being used against a cast model to transfer the centric relationship to the articulator.

Figure 1:
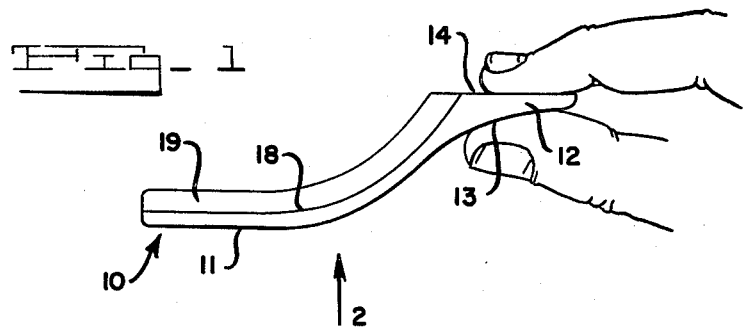
Fig. 1 is a top view of the bite tray.
Figure 2:
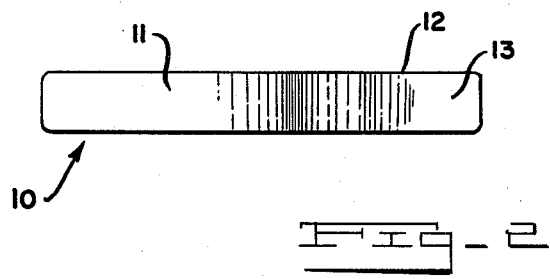
Fig. 2 is an elevational view of the bite tray, taken in the direction of arrow 2 of Fig. 1.

The bite tray, shown in Fig. 1, is generally designated as 10. It comprises a backing strip 11, formed of a substantially rigid material. The strip is curved to fit the side of an average bite area. A handle 12, provided at one end of the strip, is curved at 13 and flattened at its opposite side 14 to provide an area which is easily grasped by the thumb and the forefinger, respectively, of the dentist using the bite tray.

The inside surface 18 of the tray is coated with a thick liner 19 of a material, characterized by being solid at human body temperature but plastic slightly above human body temperature. For example, it may be plastic at 35° above body temperature so that it may be inserted against the teeth without any feeling of discomfort to the patient. It is desirable to use a material which has a low coefficient of expansion in the temperature range between it being plastic and solid, so that upon solidification, it will not shrink any substantial amount and thereby change the dimensions of the impressions formed therein.

One suitable material found useful for this purpose is that commonly known as "dental modeling compound." This is a type of dental wax that is plastic at temperatures above 120° F. and solid at body temperature. It is readily available through most, if not all, dental supply houses. The particular chemical composition of modeling compound may vary from one supply company to another, but is immaterial to the present invention.

One suitable backing strip material found useful with the above liner material is methyl methacrylate. Other suitable plastic materials which are presently commercially available will readily occur to those skilled in the art.

With the above two materials, the backing strip can be formed first, such as by the conventional casting processes, and then the liner, can be cast against the face 18, to which it will adhere. Here, the liner material is molten when cast against the strip and is permitted to solidify in contact therewith.

Note, that the backing strip is generally dimensioned so that it fits between the gingival lines of the patient's jaw and covers a substantial part of the buccal surfaces of the upper and lower teeth.

With reference to Figs. 3–6, the operation will now be described.

Figure 3:
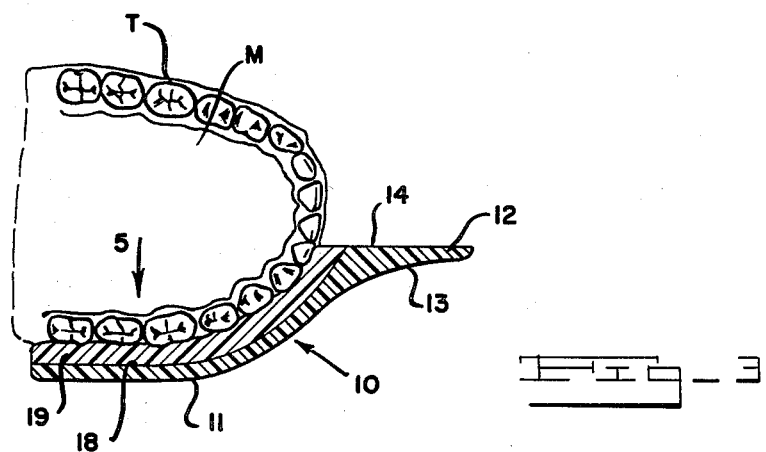
Fig. 3 is a cross-sectional view, of a fragment of a human mouth showing the bite tray pressed against the buccal surfaces of the crowns of the upper and lower teeth in the bite area.

In Figs. 3 and 4, the mouth M of a human, having teeth T is illustrated. The upper teeth are designated as 20 and the lower teeth are designated as 21.

The bite tray is inserted in the mouth so that its liner 19 is in contact with the buccal surfaces of a plurality of teeth in the bite area and is pressed against the buccal surfaces of these teeth. Prior to placing the bite tray in the mouth, the tray is heated, such as in water heated to 140°–150° F., to plasticize the liner material 19. Thus, when the tray is pressed against the buccal surface of the teeth an impression is formed, and as shown in Fig. 5, the impression 20a is a negative of the teeth 20 of the upper jaw and the impression 21a is a negative of the teeth 21 of the lower jaw. The liner material may be cooled either by permitting the liner to remain in the mouth until it is cooled, or in the alternative by spraying air or water upon it. Thereafter, the bite tray is removed from the mouth. Next, the cast model of the mouth 25, which has been previously made and which consists of an upper jaw model 26 and a lower jaw model 27, is arranged with its upper teeth 20b in contact with the lower teeth 21b. The bite tray is then placed along side the teeth corresponding to the ones from which the impression was made, with model teeth 20b fitting into impressions 20a, and model teeth 21b fitting into impressions 21a. Thus, the upper and lower model jaws are alined in the identical centric relationship as were the teeth in the human mouth. The case models are then secured to any conventional articulator 28 in the conventional way.

Thereafter, the dentist or dental technician may use the articulated model for whatever purposes he may have in mind, such as constructing a bridge, or an inlay, or the like.

This invention may be further developed within the scope of the following attached claim. Accordingly, it is desired that the foregoing description be read as being merely illustrative of an operative embodiment of this invention, and not in a strictly limiting sense.

I now claim:

A dental bite tray for registering and transferring the centric relationship between the upper and lower jaws of a human, comprising an elongated, relatively thin, substantially rigid backing strip, the strip being narrow with its transverse dimension, i.e., width, being substantially uniform throughout the length of the strip and being less than the average distance between the upper and lower gingival lines of a person, the strip being curved in its length direction into approximately the external curve of the sides of the teeth from the rearmost teeth to the anterior teeth of a person, and the strip extending from the rearmost upper and lower teeth on one side of the jaws to and including at least some of the anterior teeth on the same side of the jaws, the inside face of the curve being coated with a relatively thick liner of a material characterized by being solid at body temperature, and whose coefficient of expansion in the temperature range between body temperature and its temperature of plasticization is relatively low, wherein the bite tray may be inserted into one side of the mouth of a person, with its liner being heated to its plasticization temperature, and may be pressed against the outside surfaces of the upper and lower teeth, between the gingival lines, from the rearmost teeth to the front teeth on that side of the mouth, and upon solidification of the liner, the bite tray may be removed and used to transfer the centric relationship of the jaws to a cast model of the jaws; and the end of a strip, which is located at the anterior teeth, is extended and is arranged to extend forwardly out of the mouth, the handle being of substantially the same transverse width as the remainder of the strip and being substantially flat on the face which corresponds to the coated strip face and with its opposite face being curved to form a thumb grasping area so that the handle may be easily grasped and held between the thumb and forefinger of the user of the tray.

References Cited in the file of this patent

UNITED STATES PATENTS

| | | |
|---|---|---|
| 1,411,505 | Northwood | Apr. 4, 1922 |
| 2,171,695 | Harper | Sept. 5, 1939 |
| 2,533,855 | Ushanoff | Dec. 12, 1950 |